United States Patent
Panainte

(10) Patent No.: US 10,504,514 B2
(45) Date of Patent: Dec. 10, 2019

(54) HUMAN MACHINE INTERFACE SYSTEM AND METHOD FOR IMPROVING USER EXPERIENCE BASED ON HISTORY OF VOICE ACTIVITY

(71) Applicant: Sorin Marius Panainte, Taylor, MI (US)

(72) Inventor: Sorin Marius Panainte, Taylor, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 92 days.

(21) Appl. No.: 15/720,458

(22) Filed: Sep. 29, 2017

(65) Prior Publication Data

US 2019/0103099 A1    Apr. 4, 2019

(51) Int. Cl.
| | |
|---|---|
| *G10L 15/22* | (2006.01) |
| *G10L 15/18* | (2013.01) |
| *G10L 15/30* | (2013.01) |
| *G10L 15/06* | (2013.01) |
| *G06F 3/16* | (2006.01) |
| *G06N 20/00* | (2019.01) |
| *H04L 29/08* | (2006.01) |

(52) U.S. Cl.
CPC ............. *G10L 15/22* (2013.01); *G06F 3/167* (2013.01); *G06N 20/00* (2019.01); *G10L 15/063* (2013.01); *G10L 15/1815* (2013.01); *G10L 15/30* (2013.01); *G10L 2015/223* (2013.01); *H04L 67/10* (2013.01); *H04L 67/22* (2013.01); *H04L 67/306* (2013.01)

(58) Field of Classification Search
CPC ........................................................ G10L 15/22
USPC ............................................................ 704/232
See application file for complete search history.

(56) References Cited

U.S. PATENT DOCUMENTS

| | | | |
|---|---|---|---|
| 6,418,424 B1* | 7/2002 | Hoffberg | G06F 3/00 706/21 |
| 7,242,488 B2* | 7/2007 | Matsueda | G06F 3/1207 358/1.14 |
| 8,302,030 B2* | 10/2012 | Soroca | G06Q 30/0246 715/810 |
| 8,364,540 B2* | 1/2013 | Soroca | G06Q 30/02 705/14.64 |
| 8,812,534 B2* | 8/2014 | Platt | G06F 16/242 707/768 |

(Continued)

*Primary Examiner* — Susan I McFadden

(74) *Attorney, Agent, or Firm* — Dickinson Wright LLP

(57) ABSTRACT

A human machine interface system and method of operating the human machine interface system are provided. The system includes a voice user interface module with an audio input unit to receive a voice signal from a microphone and digitize the voice signal as an audio file. A recognition engine unit is coupled to the audio input unit and is configured to analyze the audio file and recognize a plurality of voice commands and output a plurality of recognized commands. A logger unit is coupled to the recognition engine unit to receive the plurality of recognized commands and output a user intent output and a normalized vector representation based on the plurality of recognized commands. A classification component receives the normalized vector representation from the logger unit and outputs a classified user profile to a plurality of human machine interface applications based on the normalized vector representation.

20 Claims, 7 Drawing Sheets

(56) References Cited

U.S. PATENT DOCUMENTS

| | | | |
|---|---|---|---|
| 9,058,406 B2* | 6/2015 | Soroca | G06Q 30/0247 |
| 9,779,723 B2* | 10/2017 | Panainte | H04R 1/08 |
| 9,984,688 B2* | 5/2018 | Lester | G10L 15/08 |
| 2012/0239653 A1* | 9/2012 | Platt | G06F 16/242 |
| | | | 707/737 |
| 2013/0030645 A1 | 1/2013 | Divine et al. | |
| 2017/0061965 A1 | 3/2017 | Penilla et al. | |
| 2018/0063278 A1* | 3/2018 | Helled | G06F 3/04842 |

\* cited by examiner

|  | 1ST DAY | 2ND DAY | 3RD DAY | 4TH DAY | 5TH DAY | 6TH DAY | 7TH DAY |
|---|---|---|---|---|---|---|---|
| 70 — NAVI POIS — RETAUGHT GENERAL DIRECT | 2 | 0 | 0 | 1 | 0 | 0 | 0 |
| 72 — PHONE — NR. CALLS | 3 | 4 | 2 | 1 | 4 | 3 | 2 |
| 74 — MUSIC — PLAY REQ | 2 | 0 | 3 | 4 | 1 | 0 | 1 |
| 76 — RADIO — STATIONS REQ | 4 | 2 | 1 | 3 | 2 | 1 | 0 |

HUMAN MACHINE INTERFACE SYSTEM AND METHOD FOR IMPROVING USER EXPERIENCE BASED ON HISTORY OF VOICE ACTIVITY

BACKGROUND

Voice recognition systems are increasingly in human machine interface (HMI) systems of vehicles to assist users operate various applications in vehicles, such as navigation and other infotainment functions, for example. Such systems conventionally recognize various commands from a recording of the user's voice and these commands are used to determine various predetermined intents or actions that the user desires. The user may also be able to view the actions that they are able to take or receive feedback through a graphical user interface (GUI) and/or the system may request voice input from the user via voice prompts. The actions or intents are sent to the corresponding HMI applications of the system to be carried out.

Vehicle owners and other users of voice recognition systems commonly desire increasing customization. Yet, available systems always present the user with the same options in the GUI and/or through the voice prompts presented to the user. In other words, the options for available actions for the user are not affected by the user's historical actions or intents.

SUMMARY

This section provides a general summary of the disclosure and is not a comprehensive disclosure of its full scope or all of its features, aspects or objectives.

A human machine interface system for receiving and processing a voice input from a user using a microphone and output a voice signal representative of the voice input is provided. The system includes a voice user interface module including a data store comprising a computer readable medium storing a program of instructions for the processing and a voice processor that executes the program of instructions. The voice user interface module includes an audio input unit coupled to the microphone to receive the voice signal from the microphone and digitize the voice signal as an audio file. The voice user interface module additionally includes a recognition engine unit coupled to the audio input unit. The recognition engine unit has a predetermined set of recognized commands and is configured to analyze the audio file and recognize a plurality of voice commands corresponding with the analyzed audio file and output a plurality of recognized commands. The voice user interface module also includes a logger unit coupled to the recognition engine unit to receive the plurality of recognized commands and output a user intent output and a normalized vector representation based on the plurality of recognized commands. A plurality of human machine interface applications are coupled to the logger unit to receive the user intent output of the logger and utilize the user intent output to control the plurality of human machine interface applications. A classification component including a classification processor is in communication with the logger unit to receive the normalized vector representation from the logger unit and output a classified user profile representative of a personality of the user to the plurality of human machine interface applications based on the normalized vector representation.

The voice user interface module of the human machine interface system can include the classification component and the classification processor can be the voice processor.

Additionally, the classification component of the human machine interface system can be disposed in a cloud computing system in communication with the voice user interface module.

The human machine interface system can also include a cloud computing system in communication with the voice user interface module to analyze the audio file using a deep neural algorithm and output a user sentiment.

The plurality of human machine interface applications of the human machine interface system can be configured to receive and utilize the user sentiment.

The logger unit may be configured to receive the user sentiment and utilize the user sentiment in outputting the normalized vector representation.

The plurality of human machine interface applications of the human machine interface system can include a phone application and a media application and a navigation application.

The classification component can includes a neural network implemented with the classification processor and/or include a support vector machine implemented with the classification processor.

The logger unit may be configured to normalize the plurality of recognized commands to a normalized vector representation. The classification processor of the classification component can be configured to cluster the normalized vector representation to a clustered vector representation using a clustering algorithm. Additionally, the classification processor can be configured to analyze the clustered vector representation using a machine learning algorithm to output the classified user profile to the plurality of human machine interface applications.

The human machine interface system can also include a short term memory and a long term memory. The classification processor of the classification component can be further configured to analyze the clustered vector representation in view of recorded short term functions of the clustered vector representation and recorded short term neuron parameters stored in the short term memory and recorded long term functions of the clustered vector representation and recorded long term neuron parameters stored in the long term memory using the machine learning algorithm.

The machine learning algorithm can include a radial basis function and the clustering algorithm may be a k-means algorithm.

The logger unit may additionally be configured to identify a failure rate based on at least one of a number of times that the user retries a particular command and a number of times in a session that the user is prompted by the system to repeat one of the plurality of voice commands and the user switching between the plurality of voice commands in a fixed amount of time and there being unexpected pauses initiating one of the plurality of voice commands. The logger unit can also be configured to modify the user intent output based on the failure rate. The plurality of user interface applications can be configured to provide additional help and guidance in the plurality of user interface applications in response to receiving the modified user intent output A method of operating a human machine interface system is also provided. The method includes the step of recognizing a plurality of voice commands. The method proceeds with the step of outputting a plurality of recognized commands in response to recognizing the plurality of voice commands. Next, receiving the plurality of recognized commands at a logger unit, normalizing the plurality of recognized commands to a normalized vector representation using the logger unit, and outputting a user intent output and the normalized vector representation based on the plurality of recognized commands using the logger unit. The method continues by receiving the normalized vector representation at a classification component in communication with the logger unit. Then, the next step of the method is clustering the normalized vector representation to a clustered vector representation using a clustering algorithm of the classification component. The method continues with the step of analyzing the clustered vector representation using a machine learning algorithm of the classification component. The method then includes the step of outputting a classified user profile using the machine learning algorithm to a plurality of human machine interface applications. The method concludes with the step of altering at least one of a graphical user interface of the plurality of human machine interface applications and related voice prompts associated with the plurality of human machine interface applications presented to the user.

The method can additionally include the step of identifying a failure rate using the logger unit based on at least one of a number of times that the user retries a particular command and a number of times in a session that the user is prompted by the system to repeat one of the plurality of voice commands and the user switching between the plurality of voice commands in a fixed amount of time and there being unexpected pauses initiating one of the plurality of voice commands. The method can then include the step of modifying the user intent output based on the identified failure rate using the logger unit. The method can also include the step of providing additional help and guidance in the plurality of user interface applications including modifying the graphical user interface of the plurality of human machine interface applications and the related voice prompts associated with the plurality of human machine interface applications presented to the user in response to receiving the modified user intent output.

The method can also include the steps of receiving a voice input from a user using a microphone and outputting a voice signal representative of the voice input. Additionally, the method can include the step of processing the voice signal from the microphone using an audio input unit of a voice user interface module.

The method may also include the steps of digitizing the voice signal as an audio file using the audio input unit and analyzing the audio file in view of a predetermined set of recognized commands using a recognition engine unit coupled to the audio input unit. The step of recognizing a plurality of voice commands can be further defined as recognizing the plurality of voice commands corresponding with the analyzed audio using the recognition engine unit.

The method can additionally include the steps of outputting the audio file to a cloud computing system. The method can also include determining a user sentiment based on the audio file using a deep neural algorithm of the cloud computing system and outputting a user sentiment from the cloud computing system.

The step of analyzing the clustered vector representation using a machine learning algorithm of the method can be further defined as analyzing the clustered vector representation in view of recorded short term functions of the clustered vector representation and recorded short term neuron parameters stored in a short term memory and recorded long term functions of the clustered vector representation and recorded long term neuron parameters stored in a long term memory using the machine learning algorithm.

Thus, the human machine interface system and method of operating the human machine interface system according to the disclosure provides various advantages. Specifically, the human machine interface system can predict the needs of the user extracted from the usage of the human machine interface system to improve the user experience. More specifically, the human machine interface system uses the classified user profile from the classification component to trigger graphical user interface changes, voice prompt adjustments, for example.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only of selected embodiments and not all implementations, and are not intended to limit the present disclosure to only that actually shown. With this in mind, various features and advantages of example embodiments of the present disclosure will become apparent from the written description when considered in combination with the appended Figures, wherein:

FIG. 4 illustrates a plurality of recognized commands that can be utilized by the classification component of the human machine interface system for a plurality of days according to aspects of the disclosure.

DETAILED DESCRIPTION

Users of voice recognition systems increasingly desire human machine interface systems that can be customized and personal assistant type functionality. However, conventional systems only recognize various commands from a recording of the user's voice and these commands are used to determine various predetermined intents or actions that the user desires. While, the user may be able to view the actions that they are able to take or receive feedback through a graphical user interface (GUI) and/or the system may request voice input from the user via voice prompts, the options for available actions for the user are not affected by the user's historical actions or intents. Thus, available systems always present the user with the same options in the GUI and/or through the voice prompts presented to the user, no matter what actions the user has previously made or the mood of the user. Thus, there is a need for an improved human machine interface systems.

Figure 1:
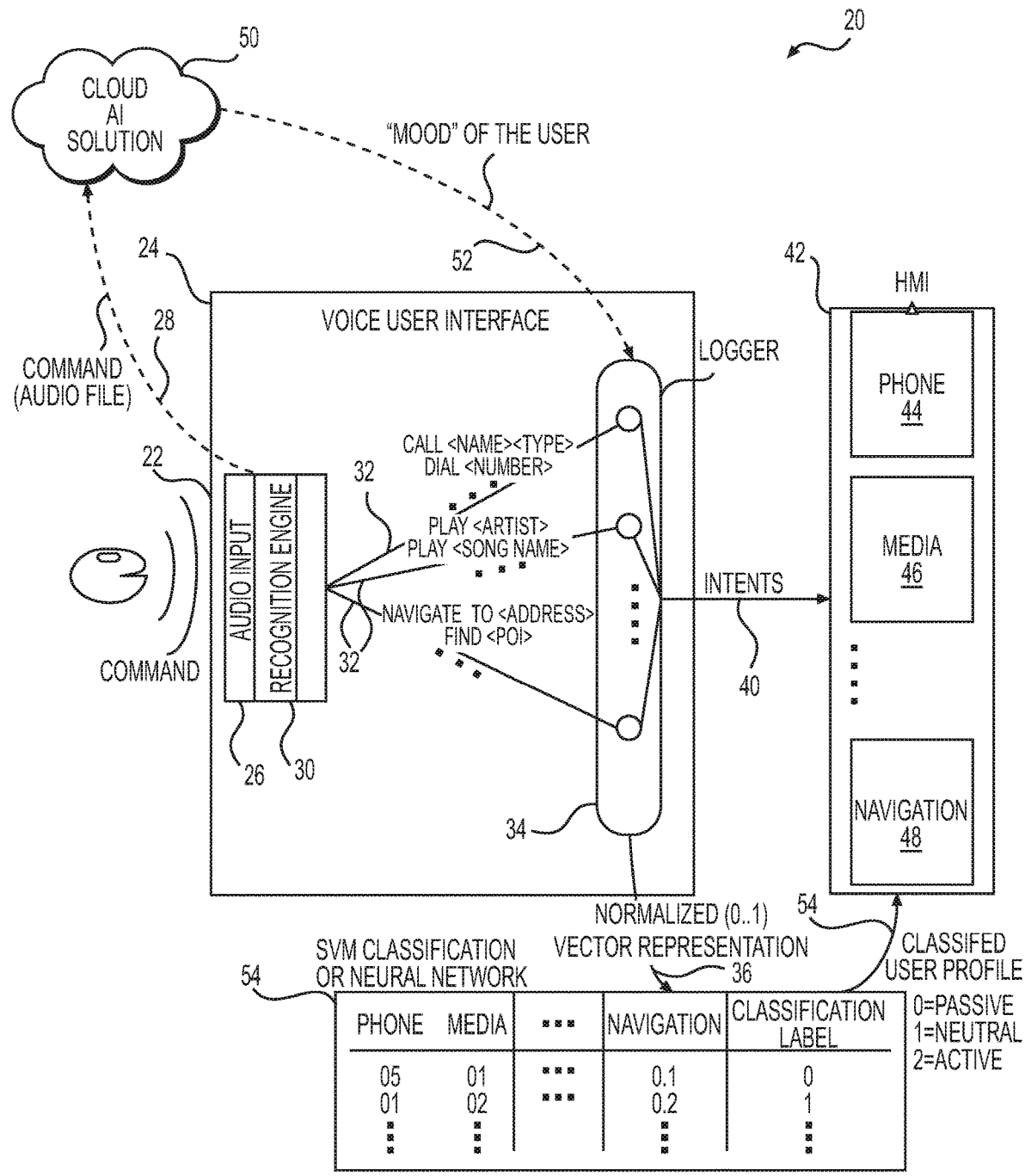
FIG. 1 illustrates a human machine interface system according to aspects of the disclosure.
Figure 2:
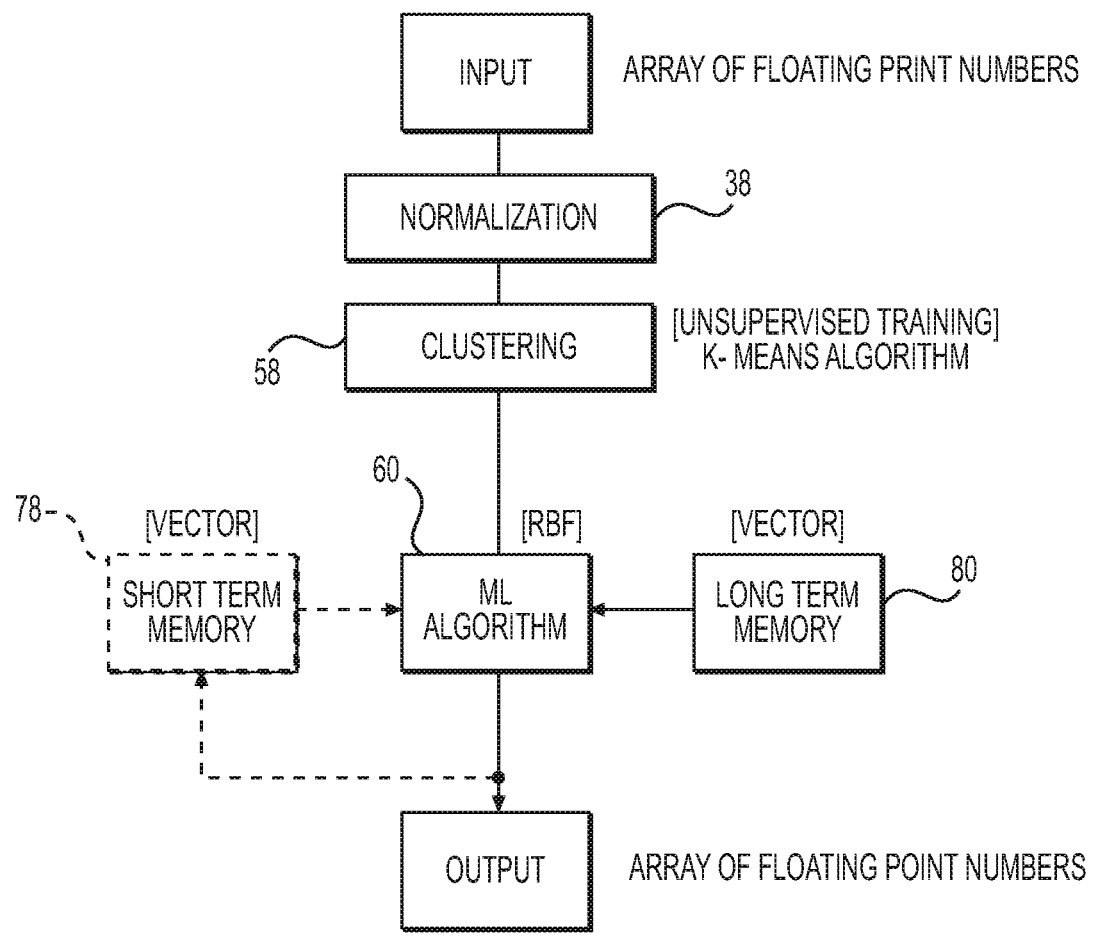
FIG. 2 illustrates a block diagram including a normalization algorithm and clustering algorithm and machine learning algorithm and short term memory and long term memory of the human machine interface system according to aspects of the disclosure.

Referring to the Figures, wherein like numerals indicate corresponding parts throughout the several views, a human machine interface system 20 for receiving and processing a voice input from a user using a microphone 22 and output a voice signal representative of the voice input is provided in FIGS. 1 and 2. The system includes a voice user interface module 24 including a data store comprising a computer readable medium storing a program of instructions for the processing and a voice processor that executes the program of instructions. The voice user interface module 24 also includes an audio input unit 26 coupled to the microphone 22 to receive the voice signal from the microphone 22 and digitize the voice signal as an audio file 28. The voice user interface module 24 additionally includes a recognition engine unit 30 coupled to the audio input unit 26. The recognition engine unit 30 includes a predetermined set of recognized commands 32 and is configured to analyze the audio file 28 and recognize a plurality of voice commands corresponding with the analyzed audio file 28 and output a plurality of recognized commands 32.

The voice user interface module 24 also includes a logger unit 34 coupled to the recognition engine unit 30 to receive the plurality of recognized commands 32. The logger unit 34 is configured to normalize the plurality of recognized commands 32 to a normalized vector representation 36 using a normalization algorithm 38 and output a user intent output 40 and the normalized vector representation 36 based on the plurality of recognized commands 32.

A plurality of human machine interface applications 42 are coupled to the logger unit 34 to receive the user intent output 40 of the logger unit 34 and utilize the user intent output 40 to control the plurality of human machine interface applications 42. The plurality of human machine interface applications 42 includes a phone application 44 and a media application 46 and a navigation application 48; however, it should be understood that the plurality of human machine interface applications 42 could alternatively include fewer or additional human machine interface applications 42.

In addition, the logger unit 34 can be configured to identify a failure rate based on at least one of a number of times that the user retries a particular command and a number of times in a session that the user is prompted by the system 20 (e.g., using the plurality of human machine interface applications 42) to repeat one of the plurality of voice commands. The failure rate can also be based on the user switching between the plurality of voice commands in a fixed amount of time and/or there being unexpected pauses initiating one of the plurality of voice commands. In other words, in addition to monitoring of general commands for navigation, phone, and media, for example, the logger unit 34 will also identify the failure rate. Consequently, the logger unit 34 can modify the user intent output 40 based on the failure rate. The plurality of user interface applications 42 can then be configured to provide additional help and guidance in response to receiving the modified user intent output 40. The additional help and guidance can take the form of audio or voice prompts and/or visually (e.g., text displayed on a screen) using the plurality of user interface applications 42. As an example, for an "expert" user, the plurality of user interface applications 42 can utilize fewer or shorter help prompts as compared to more or longer help prompts for a "novice" user.

The human machine interface system 20 can also include a cloud computing system 50 in communication with the voice user interface module 24 to analyze the audio file 28 using a deep neural algorithm and output a user sentiment 52. The logger unit 34 is configured to receive the user sentiment 52 and utilize the user sentiment 52 in outputting the normalized vector representation 36. The plurality of human machine interface applications 42 may be configured to receive and utilize the user sentiment 52, as well.

Figure 3:
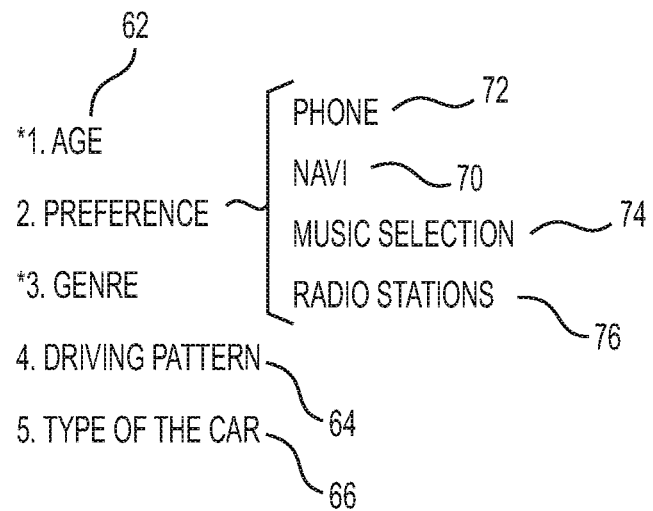
FIG. 3 illustrates reference information utilized by a classification component of the human machine interface system according to aspects of the disclosure.

A classification component 54 including a classification processor is in communication with the logger unit 34 to receive the normalized vector representation 36 from the logger unit 34 and output a classified user profile 56 representative of a personality of the user to the plurality of human machine interface applications 42 based on the normalized vector representation. Specifically, the classification component 54 can include a neural network implemented with the classification processor; nevertheless, it should be appreciated that the classification component 54 may alternatively include a support vector machine implemented with the classification processor (FIG. 1). The classification processor of the classification component 54 can be configured to cluster the normalized vector representation 36 to a clustered vector representation using a clustering algorithm 58 (FIG. 2). Such a clustering algorithm 58 can, for example, be a k-means algorithm. Finally, the classification component 54 is configured to analyze the clustered vector representation using a machine learning algorithm 60 to output the classified user profile 56 to the plurality of human machine interface applications 42. Specifically, the machine learning algorithm 60 can be a "supervised" machine learning algorithm 60 (FIG. 1) or an "unsupervised" machine learning algorithm 60 (FIG. 2). In more detail, the "unsupervised" machine learning algorithm 60 can include a radial basis function (RBF). The classification component 54 can not only utilize the plurality of recognized commands 32, but can also take into account various other reference information listed in FIG. 3, either provided or collected for the user, such as the user's age 62, driving pattern 64, and the type of the car 66, for example when outputting the classified user profile 56. As best shown in FIG. 4, the plurality of recognized commands 32 that are represented by the normalized vector representation can be utilized from a plurality of days 68 (or some other period of time, such as a week) and can include various metrics such as navigation points of interest 70 (POIs), number of phone calls 72, music play requests 74, and/or what radio stations 76 have been requested.

The human machine interface system 20 can further include a short term memory 78 and a long term memory 80 (FIG. 2) storing a short-term memory vector and a long-term memory vector, respectively. As a result, the classification processor of the classification component 54 can be further configured to analyze the clustered vector representation in view of recorded short term functions of the clustered vector representation and recorded short term neuron parameters stored in the short term memory 78. Similarly, the classification processor of the classification component 54 can also be configured to analyze recorded long term functions of the clustered vector representation and recorded long term neuron parameters stored in the long term memory 80 using the machine learning algorithm 60. While the voice user interface module 24 can include the classification component 54 and the classification processor can be the voice processor, it should be appreciated that the classification component 54 could reside elsewhere, such as in the cloud computing system 50 in communication with the voice user interface module 24. Also, it should be understood that the RBF mentioned above, that can be used for the machine learning algorithm 60, may not use the short-term memory vector.

Figure 5A:
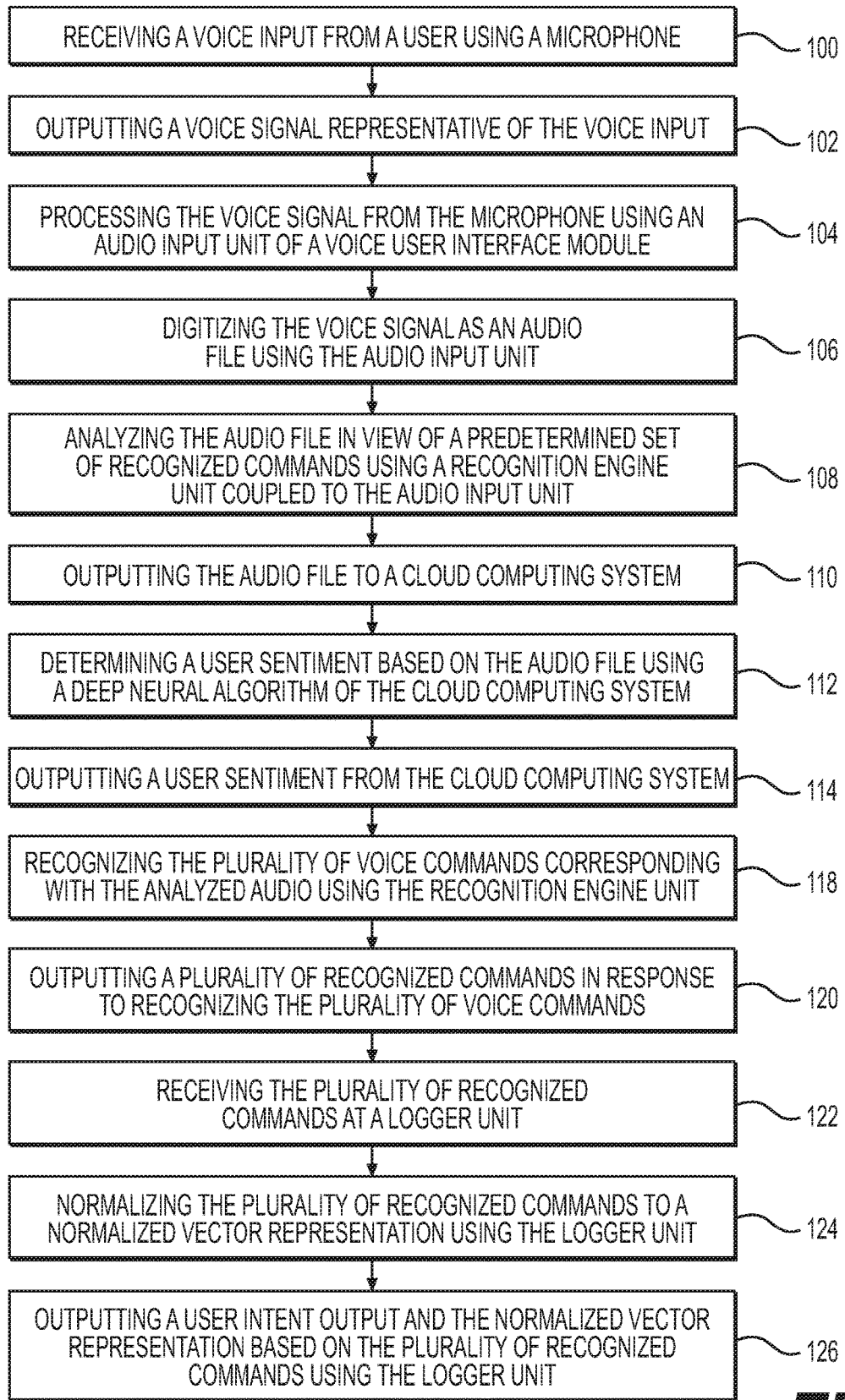
FIGS. 5A, 5B, and 6 illustrate steps of a method of operating the human machine interface system according to aspects of the disclosure.
Figure 5B:
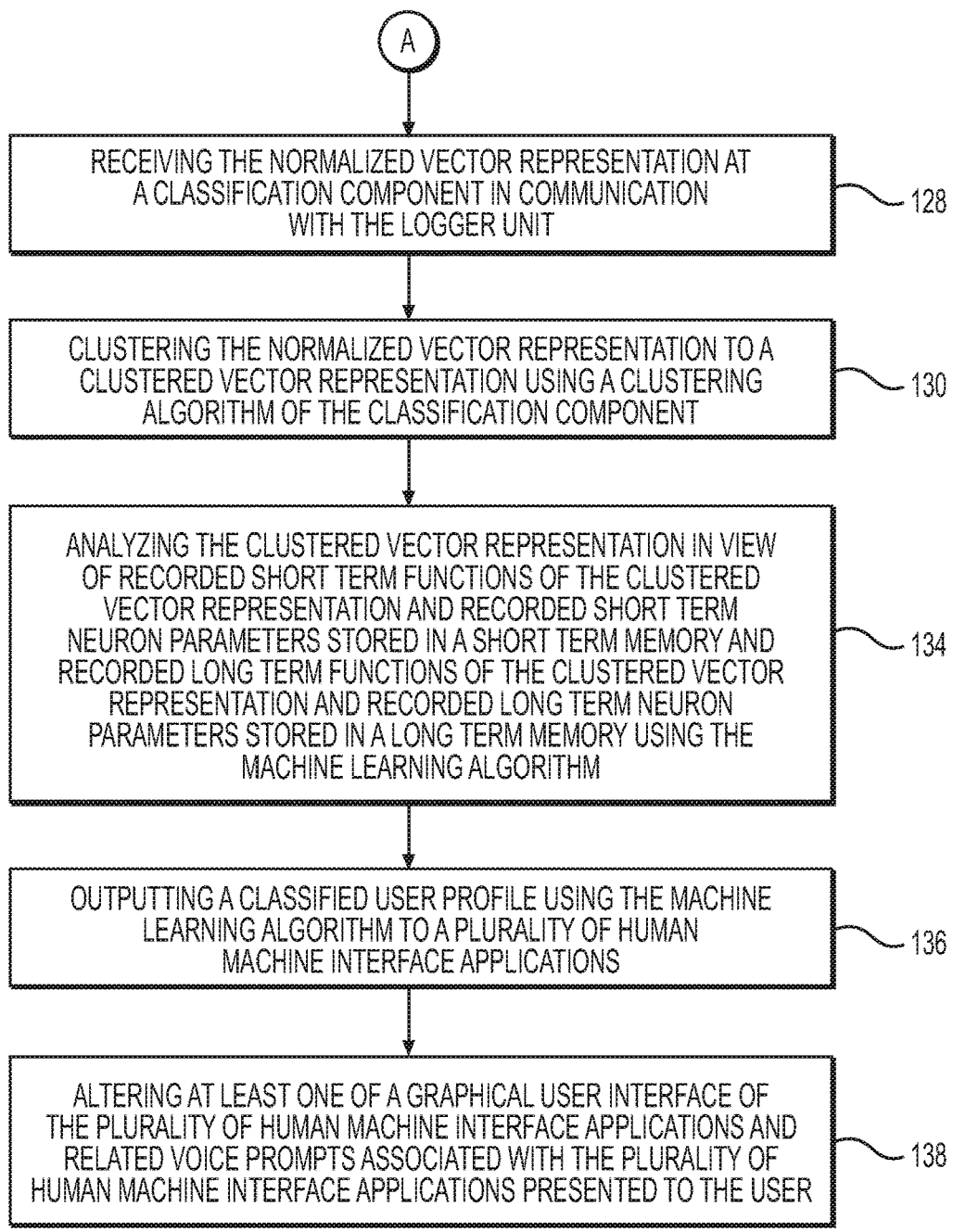
Figure 6:
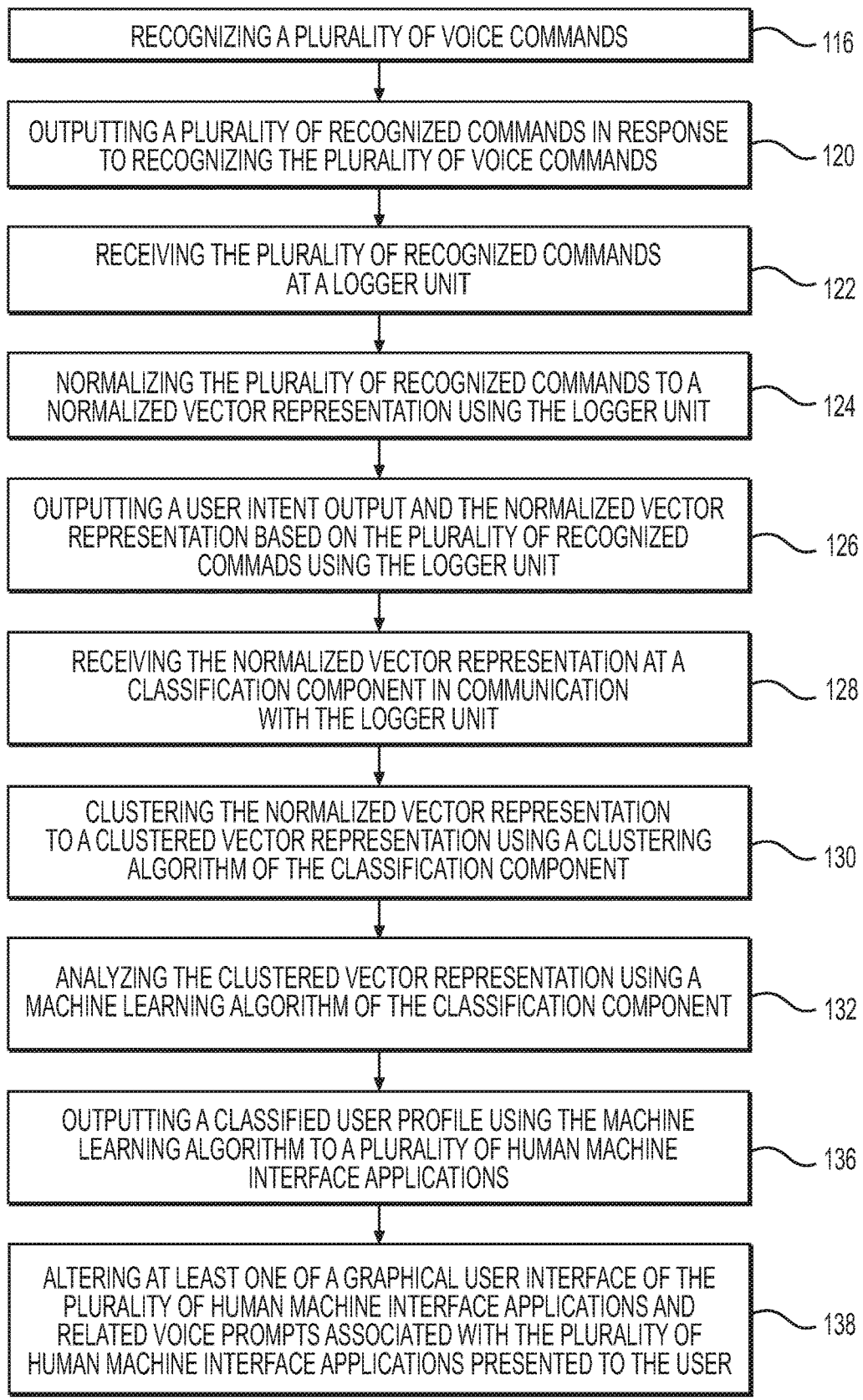

As best shown in FIGS. 5A, 5B, and 6, a method of operating a human machine interface system 20 is also provided. The method begins with the step of 100 receiving a voice input from a user using a microphone 22. The method continues with the steps of 102 outputting a voice signal representative of the voice input and 104 processing the voice signal from the microphone 22 using an audio input unit 26 of a voice user interface module 24. The method can continue with the steps of 106 digitizing the voice signal as an audio file 28 using the audio input unit 26 and 108 analyzing the audio file 28 in view of a predetermined set of recognized commands 32 using a recognition engine unit 30 coupled to the audio input unit 26.

Additionally, the method can include 110 outputting the audio file 28 to a cloud computing system 50. If the audio file 28 is output to the cloud computing system 50, the method can includes the steps of 112 determining a user sentiment 52 (i.e., mood) based on the audio file 28 using a deep neural algorithm of the cloud computing system 50 and 114 outputting a user sentiment 52 from the cloud computing system 50. In other words, the mood of the user is extracted from the voice commands. As discussed above, the logger unit 34 can be configured to receive the user sentiment 52 and utilize the user sentiment 52 in outputting the normalized vector representation. Alternatively, or in addition, the user sentiment 52 may be utilized by the plurality of human machine interface applications 42.

The method proceeds with the step of 116 recognizing a plurality of voice commands. Specifically, the step of 116 recognizing a plurality of voice commands can be further defined as 118 recognizing the plurality of voice commands corresponding with the analyzed audio using the recognition engine unit 30. The method proceeds with the step of 120 outputting a plurality of recognized commands 32 in response to recognizing the plurality of voice commands. Next, 122 receiving the plurality of recognized commands 32 at a logger unit 34, 124 normalizing the plurality of recognized commands 32 to a normalized vector representation 36 using the logger unit 34, and 126 outputting a user intent output 40 and the normalized vector representation 36 based on the plurality of recognized commands 32 using the logger unit 34.

As discussed above, the logger unit 34 can also identify a failure rate that can result in additional help or guidance being provided through the plurality of human machine interface applications 42. Thus, the method can additionally include the step of identifying a failure rate using the logger unit 34 based on at least one of a number of times that the user retries a particular command and a number of times in a session that the user is prompted by the system to repeat one of the plurality of voice commands and the user switching between the plurality of voice commands in a fixed amount of time and there being unexpected pauses initiating one of the plurality of voice commands. The method can then include the step of modifying the user intent output 40 based on the identified failure rate using the logger unit 34. The method can also include the step of providing additional help and guidance in the plurality of user interface applications 42 including modifying the graphical user interface of the plurality of human machine interface applications 42 and the related voice prompts associated with the plurality of human machine interface applications 42 presented to the user in response to receiving the modified user intent output 40.

The method continues by 128 receiving the normalized vector representation 36 at a classification component 54 in communication with the logger unit 34. Then, the next step of the method is 130 clustering the normalized vector representation 36 to a clustered vector representation using a clustering algorithm 58 of the classification component 54. The method continues with the step of 132 analyzing the clustered vector representation using a machine learning algorithm 60 of the classification component 54. As discussed above, the machine learning algorithm 60 can include a radial basis function and the clustering algorithm 58 can be a k-means algorithm, for example.

In the event that the human machine interface system 20 includes the short term memory 78 and long term memory 80, the step of 132 analyzing the clustered vector representation using a machine learning algorithm 60 of the classification component 54 can further defined as 134 analyzing the clustered vector representation in view of recorded short term functions of the clustered vector representation and recorded short term neuron parameters stored in a short term memory 78 and recorded long term functions of the clustered vector representation and recorded long term neuron parameters stored in a long term memory 80 using the machine learning algorithm 60. The method then includes the step of 136 outputting a classified user profile 56 using the machine learning algorithm 60 to a plurality of human machine interface applications 42. As discussed above, the classification component 54 can also utilize reference information, such as the user's age 62, driving pattern 64, and the type of the car 66, when outputting the classified user profile 56.

The method concludes by 138 altering at least one of a graphical user interface (GUI) of the plurality of human machine interface applications 42 and related voice prompts associated with the plurality of human machine interface applications 42 presented to the user. Thus, the classified user profile 56 can be mapped in certain categories (e.g., active type, neutral, or passive), based on the history of the plurality of recognized commands 32 received by the system 20. So, the disclosed human machine interface system 20 uses the classified user profile 56 from the classification component 54 to trigger GUI changes, voice prompt adjustments and convenience type support (predict user intention, shortcuts, and additional content) to improve the user experience. Consequently, the human machine interface system 20 can be tuned better to match the profile of the user and predict the needs of the user extracted from the usage of the human machine interface system 20.

Embodiments disclosed herein can be implemented in digital electronic circuitry, or in computer software, firmware, or hardware, including the herein disclosed structures and their equivalents. Some embodiments can be implemented as one or more computer programs, i.e., one or more modules of computer program instructions, encoded on a tangible computer storage medium for execution by one or more processors (e.g., voice processor or classification processor). A computer storage medium (e.g., the data store of the voice user interface module 24) can be, or can be included in, a computer-readable storage device, a computer-readable storage substrate, or a random or serial access memory. The computer storage medium can also be, or can be included in, one or more separate tangible components or media such as multiple CDs, disks, or other storage devices. The computer storage medium does not include a transitory signal.

As used herein, the term processor encompasses all kinds of apparatus, devices, and machines for processing data, including by way of example a programmable processor, a computer, a system on a chip, or multiple ones, or combinations, of the foregoing. The processor can include special purpose logic circuitry, e.g., an FPGA (field programmable gate array) or an ASIC (application-specific integrated circuit). The processor also can include, in addition to hardware, code that creates an execution environment for the computer program in question, e.g., code that constitutes processor firmware, a protocol stack, a database management system, an operating system, a cross-platform runtime environment, a virtual machine, or a combination of one or more of them.

A computer program (also known as a program, module, engine, software, software application, application, script, or code) can be written in any form of programming language, including compiled or interpreted languages, declarative or procedural languages, and the program can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

To provide for interaction with an individual, the herein disclosed embodiments can be implemented using an interactive display, such as GUI mentioned above. Such GUI's may include interactive features such as pop-up or pull-down menus or lists, selection tabs, scannable features, and other features that can receive human inputs.

The system 20 disclosed herein can include clients and servers. A client and server are generally remote from each other and typically interact through a communications network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

Obviously, many modifications and variations of the claimed invention are possible in light of the above teachings and may be practiced otherwise than as specifically described while within the scope of the appended claims. These antecedent recitations should be interpreted to cover any combination in which the inventive novelty exercises its utility.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated degrees or at other orientations) and the spatially relative descriptions used herein interpreted accordingly.

I claim:
1. A human machine interface system, comprising:
a processor; and a memory that includes instructions that, when executed by the processor, cause the processor to:
generate an audio file corresponding to a voice input of a user;
identify, using a predetermined set of recognized commands, a plurality of recognized commands corresponding to the audio file;
receive, from a cloud computing system remotely located from the processor, a user sentiment corresponding to the audio file;
generate a normalized vector representation based on the plurality of recognized commands and the user sentiment;
determine, based on at least the plurality of recognized commands, a user intent output corresponding to an experience of the user;
control a plurality of human machine interface applications using the user intent output;
receive, from the cloud computing system, a classified user profile based on the normalized vector representation; and
output the classified user profile to the plurality of human machine interface applications.

2. The human machine interface system as set forth in claim 1, wherein cloud computing is configured to:
cluster the normalized vector representation to a clustered vector representation using a clustering algorithm; and
analyze the clustered vector representation using a machine learning algorithm to output the classified user profile to the plurality of human machine interface applications.

3. The human machine interface system as set forth in claim 2, further including a short term memory and a long term memory and wherein the cloud computing system is further configured to analyze the clustered vector representation in view of recorded short term functions of the clustered vector representation and recorded short term neuron parameters stored in the short term memory and recorded long term functions of the clustered vector representation and recorded long term neuron parameters stored in the long term memory using the machine learning algorithm.

4. The human machine interface system as set forth in claim 2, wherein the machine learning algorithm includes a radial basis function.

5. The human machine interface system as set forth in claim 2, wherein the clustering algorithm is a k-means algorithm.

6. The human machine interface system as set forth in claim 1, wherein the instructions further cause the processor to:
identify a failure rate based on at least one of a number of times that the user retries a particular command and a number of times in a session that the user is prompted by the system to repeat one of the plurality of voice commands and the user switching between the plurality of voice commands in a fixed amount of time and there being unexpected pauses initiating one of the plurality of voice commands;
modify the user intent output based on the failure rate; and
provide additional help and guidance to the user in response to receiving the modified user intent output.

7. The human machine interface system as set forth in claim 1, wherein the plurality of human machine interface applications include a phone application and a media application and a navigation application.

8. The human machine interface system as set forth in claim 1, wherein the cloud computing system includes a neural network used to generate the classified user profile.

9. The human machine interface system as set forth in claim 1, wherein the cloud computing system includes a support vector machine used to generate the classified user profile.

10. The human machine interface system as set forth in claim 1, wherein the plurality of human machine interface applications are configured to receive and utilize the user sentiment.

11. A system for a vehicle, the system comprising:
a processor; and
a memory that includes instructions that, when executed by the processor, cause the processor to:
identify a plurality of recognized commands based on an audio file corresponding to a voice input;
generate, using a deep neural algorithm, a user sentiment corresponding to the audio file;
generate a normalized vector representation based on the plurality of recognized commands and the user sentiment;
generate, using a neural network, a classified user profile based on the normalized vector representation; and
communicate the classified user profile to at least one human machine interface application.

12. The system as set forth in claim 11, wherein the at least one human machine interface application is configured to receive and utilize the user sentiment.

13. The system as set forth in claim 11, wherein the at least one human machine interface application includes one of a phone application, a media application, and a navigation application.

14. The system as set forth in claim 11, wherein the instructions further cause the processor to:
cluster the normalized vector representation to a clustered vector representation using a clustering algorithm; and
analyze the clustered vector representation using a machine learning algorithm to output the classified user profile to the at least one human machine interface application.

15. The system as set forth in claim 14, further including a short term memory and a long term memory and wherein the instructions further cause the processor to analyze the clustered vector representation in view of recorded short term functions of the clustered vector representation and recorded short term neuron parameters stored in the short term memory and recorded long term functions of the clustered vector representation and recorded long term neuron parameters stored in the long term memory using the machine learning algorithm.

16. The system as set forth in claim 14, wherein the machine learning algorithm includes a radial basis function.

17. The system as set forth in claim 14, wherein the clustering algorithm is a k-means algorithm.

18. A voice recognition system, comprising:
a processor configured to:
receive a voice input from an input device;
generate an audio file based on the voice input; and
identify a plurality of recognized commands corresponding to the audio file;
at least one cloud computing device remotely located from the processor and configured to generate, using a deep neural algorithm, a user sentiment corresponding to the audio file; and a neural network in communication with the processor and configured to:
  receive, from the processor, a normalized vector representation corresponding to the plurality of recognized commands and the user sentiment; and
  generate, based on the normalized vector representation, a classified user profile.

19. The system of claim 18, wherein the processor is further configured to communicate the classified user profile to at least one human machine interface application.

20. The system as set forth in claim 19, wherein the at least one human machine interface application is configured to receive and utilize the user sentiment.

* * * * *